June 2, 1942.  J. L. ANDERSON  2,284,711
PIPE CUTTING MACHINE
Filed May 7, 1940  2 Sheets-Sheet 1
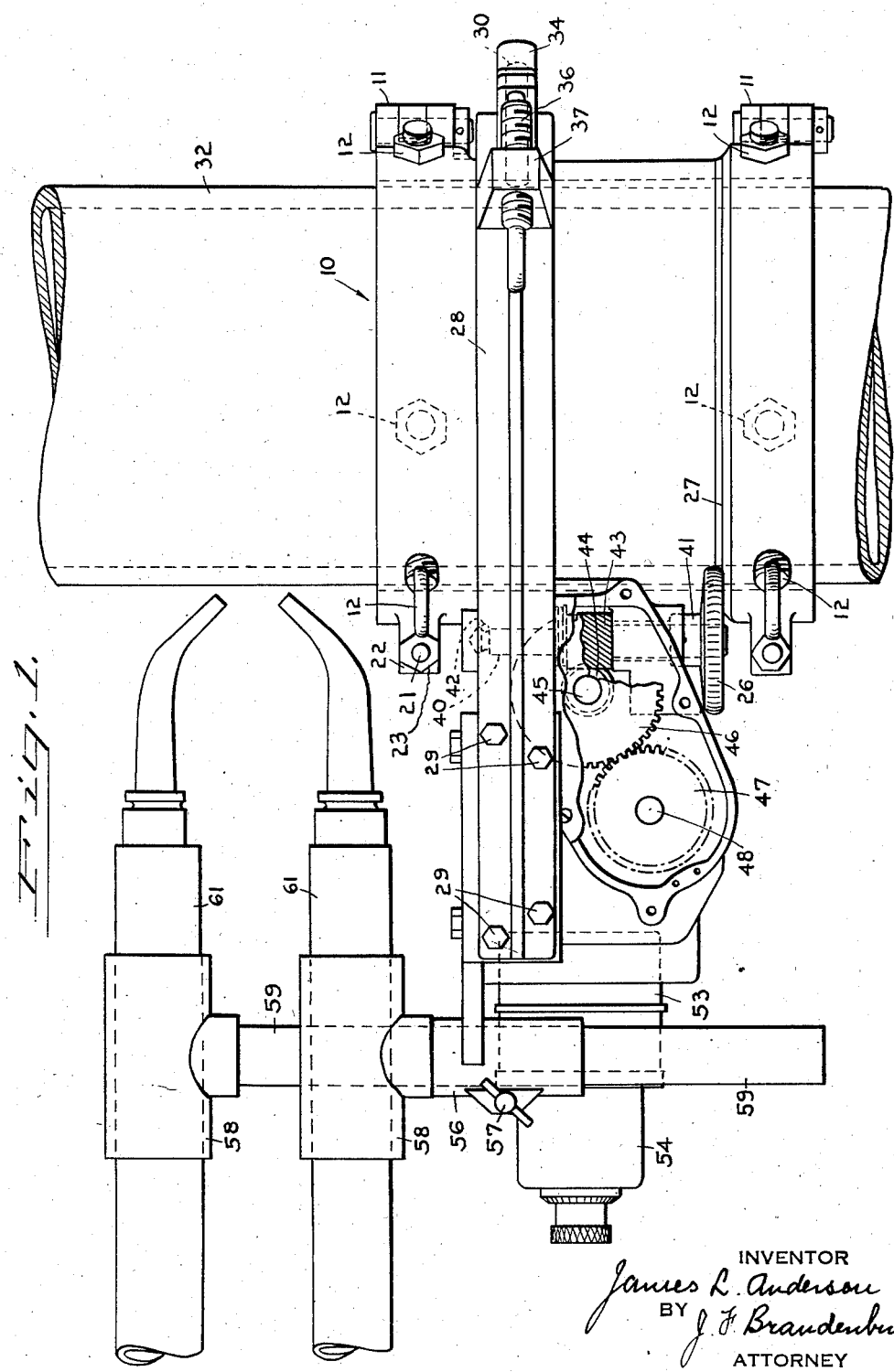
INVENTOR
James L. Anderson
BY J. F. Brandenburg
ATTORNEY Patented June 2, 1942

2,284,711

UNITED STATES PATENT OFFICE 2,284,711

PIPE CUTTING MACHINE

James L. Anderson, Closter, N. J., assignor to Air Reduction Company, Incorporated, New York, N. Y., a corporation of New York Application May 7, 1940, Serial No. 333,719

4 Claims. (Cl. 266—23)

This invention relates to apparatus for cutting pipes, and especially to machines for cutting a pipe which is disposed in a vertical position. The invention is intended primarily for cutting of the upper end of oil well casings when removing such casings from the ground.

After a well has been abandoned, it is customary to salvage the casing which sometimes includes more than a mile of pipe. As the casing is put down into the ground different sections of pipe are welded or screwed together into a continuous length. In withdrawing the casing, therefore, it is necessary to cut off the upper portion from time to time into manageable lengths.

It is an object of this invention to provide improved apparatus for cutting pipe, and especially for cutting apart a well casing when withdrawing such casing from the ground.

It is a feature of the invention that it makes a cut with bevel sides so that the salvaged sections of the casing are ready for use in new wells without further preparation of the edges for welding.

If the casing is cut apart at the welds, as it is pulled out of the ground, it may be desirable to make a wide cut that removes the metal of the weld, and it is another feature of this invention that the width of the cut can be controlled so as to remove a band of metal of any desired width when cutting off the upper section of a casing. The invention employs two bevel cutting torches that project converging cutting jets, and the spacing of the torches is adjustable to control the width of kerf or make the cut as two spaced kerfs on opposite sides of the band of metal that is to be removed.

Other objects, features and advantages of the invention will appear or be pointed out as the specification proceeds.

In the accompanying drawings, forming part hereof:

Fig. 1 is a side elevation, partly broken away, of a pipe cutting machine embodying this invention.

Fig. 2 is a top plan view of the machine shown in Fig. 1, but with the carriage turned into a different position with respect to the pipe clamp.

Figure 6:
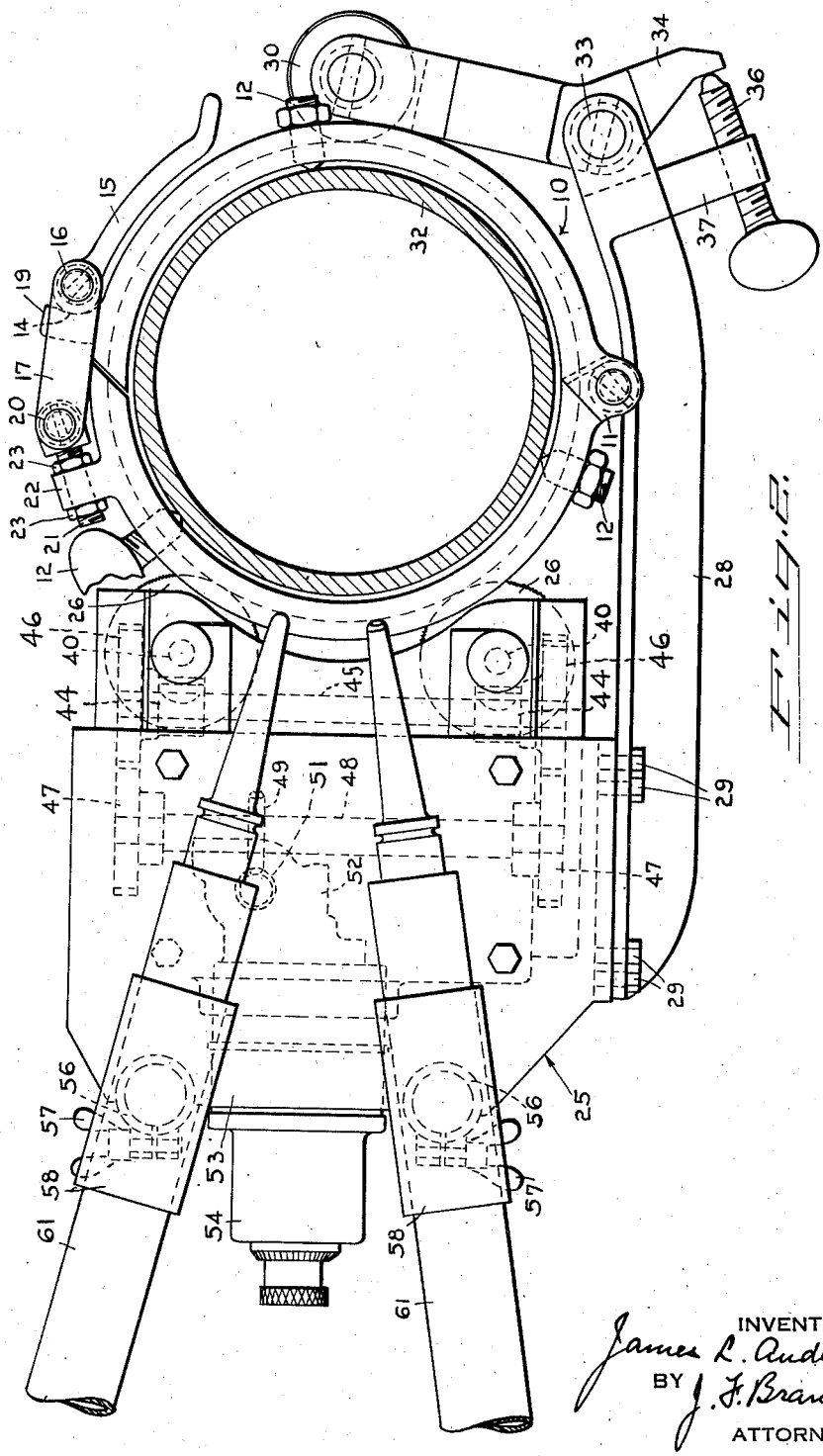

A clamp 10 includes two semi-circular sections connected together by hinges 11. The clamp 10 is centered and can be adjusted for a limited range of pipe sizes by centering screws 12 (Fig. 2) which thread through the clamp at angularly spaced points around the circumference of the clamp.

The clamp 10 is held closed by a cam 14 at one end of a lever 15 that is connected by a pivot 16 to a link 17. The cam 14 bears against a recessed face of a lug 19 extending from one section of the clamp, and the link 17 is connected with the other section of the clamp by a pawl 20 at one end of a screw 21 that passes through a lug 22 on the clamp and is held in position by nuts 23 on both sides of the lug 22.

The cam 14 passes its high point just before the lever 15 reaches a position close to the side of the clamp, shown in Fig. 2, and the pressure of the clamp therefore holds the lever 15 in this closed position. The force with which the clamp grips the pipe can be controlled by adjusting the screws 12 which are the contact points of the clamp, or by moving the nuts 23 so as to shift the pivot 20 nearer to or further from the lug 22.

The exterior of the clamp 10 between the hinges 11 provides a peripheral area which is continuous except for the cracks dividing the two sections of the clamp. This area serves as a running surface for wheels of a torch carriage 25.

The torch carriage 25 has two wheels 26 that bear against a shoulder 27 (Fig. 1) on the peripheral area of the clamp 10. An arm 28 is rigidly connected with the torch carriage 25 by screws 29 and extends part-way around the clamp 10 and a pipe 32 that is gripped by the clamp. The arm 28 carries an idler wheel or roller 30, which contacts with the pipe clamp and reacts against one side of the clamp to hold the carriage against the other side of the clamp.

The location of the wheel 30 on the opposite side of the clamp 10 from the carriage 25 need not be exactly as shown in Fig. 2. The reaction of this wheel 30 against the clamp will hold the carriage 25 to the clamp and pipe provided that a diameter of the clamp passing through the point of contact of the wheel 30 on the clamp passes between the points at which the carriage wheels 26 touch the clamp.

The arm 28 is jointed at pivot 33. There is an extension 34 on the end link which carries the wheel 30. An adjusting screw 36 threads through a lug 37 on the fixed portion of the arm 28 and contacts with the extension 34 to urge the end link of arm 28 counterclockwise and hold the wheel 30 against the clamp. The pressure of the wheel 30, and the resulting pressure of the wheels 26 against the clamp is controlled by changing the adjustment of the screw 36.

Each of the wheels 26 is pinned to a shaft 40 journaled in bearings in the frame of the carriage 25. Each wheel 26 has a large hub 41 (Fig. 1) that contacts with a surface of the carriage frame and serves as a thrust bearing for supporting the weight of the carriage frame and the structure mounted on the frame.

The shafts 40 are held against axial displacement, when not loaded, by a dowel pin 42 that is held in the carriage frame and passes through a peripheral groove in each shaft 40 near the upper ends of those shafts.

A spiral gear 43 keyed to each shaft 40 is driven by a spiral gear 44 keyed to a cross-shaft 45 that turns in bearings in the carriage frame. Spur gears 46 secured to opposite ends of the cross-shaft 45 mesh with gears 47 fixed to opposite ends of a countershaft 48.

The countershaft 48 is driven by a worm wheel 49 (Fig. 2) that meshes with a worm 51 at the low-speed end of a reduction gearing 52. The reduction gearing is driven by an electric motor 53 equipped with a centrifugal governor 54.

There are split clamps 56 connected to, and preferably integral with, the carriage frame on opposite sides of the motor 53. Each of these clamps has a bolt and wing nut 57, by which it can be drawn together. Torch-holders 58 have stems 59 (Fig. 1) that fit into the split clamps 56 and are gripped by the clamps to hold the torch-holders in any adjusted position.

Torches 61 carried by the torch-holders 58 have tips constructed and arranged to cut bevels extending in opposite directions so that both faces of the final cut are beveled and suitable for subsequent welding without further treatment. The torches 61 can be adjusted vertically to control to a limited extent the width of the cut and the shape of the ends, such as a single or double bevel, but more especially to space the kerfs cut by the respective torches so that the two cuts are on opposite sides of the band of metal which is to be cut out of the casing.

The carriage wheels 26 have rough treads to improve their traction and both of the carriage wheels are driven. The center of gravity of the carriage with its supported load is well out from the pipe and clamp 10 and to the left of the wheels 26 in Fig. 1. The weight of the structure therefore tends to rotate the carriage 25, and the parts connected with the carriage, counterclockwise around an axis which passes through the points at which the wheels 26 contact with the clamp. It is a feature of the invention that the wheel 30, which reacts against the clamp to hold the structure against such rotation, is located at a substantially higher level than the carriage wheels 26, so as to increase the effective leverage through which the reaction force of the wheel 30 operates.

Although intended primarily for cutting well casings, this invention can be used for other cutting, and can be used with only a single torch, and with straight tips. The structure can be converted into a welding machine by substituting one or more welding torches for the cutting torches shown. Other changes and modifications can be made in the construction, and some features of the invention can be used without others.

I claim:

1. A cutting machine for upwardly extending pipes comprising a clamp that surrounds and grips the pipe, said clamp having a substantial width or vertical extent along the pipe, a torch support movable around the circumference of the clamp, and means by which the torch support is held in a definite spaced relation to the clamp including three rollers in contact with the clamp at angularly spaced points around the circumference of the clamp, all of the rollers on the same side of the pipe as the center of gravity of the torch support being at a different and lower level from the roller on the other side.

2. A cutting machine for substantially vertically extending pipes comprising a clamp that surrounds and grips the pipe, said clamp having a substantial width or vertical extent along the pipe, a torch support movable around the circumference of the clamp, a shoulder on the clamp, wheels on the torch support and all in the same plane of rotation and in positions to run on the shoulder and against the clamp to hold the torch support at a definite spaced relation from the clamp and pipe, an arm extending from the torch support part-way around the clamp, and a single wheel carried by said arm in position to contact with a bearing surface of said clamp on the side of the clamp opposite the torch support to hold said torch support against the clamp, the wheel carried by said arm being located at a level substantially higher than the wheels of the torch support that roll on said shoulder.

3. Apparatus for cutting a vertically extending pipe comprising a torch support including three and only three wheels by which said support is upheld by the pipe and on which said support travels around the pipe, two of said wheels being on a different side of the pipe from the other wheel and at a different level from said other wheel, one or more of the wheels nearest the center of gravity of the torch support being at the lower level.

4. A portable pipe cutting machine for cutting a substantially vertically extending pipe, said machine including a torch-supporting carriage with a plurality of wheels by which said carriage is upheld by the pipe and on which said carriage travels around the pipe, said wheels being at angularly spaced points around the circumference of the pipe, all of the wheels on one side of the pipe being at a different level than on the other side of the pipe, the one or more wheels nearest the center of gravity of the machine being at the lower level.

JAMES L. ANDERSON.